July 10, 1956  A. S. BERCHIELLI  2,754,348
BATTERY ELECTRODE AND PROCESS FOR MAKING SAME
Filed Jan. 14, 1953

ALDO SALVATORE BERCHIELLI
INVENTOR.

BY Karl F. Ross

AGENT

United States Patent Office 2,754,348
Patented July 10, 1956

2,754,348
BATTERY ELECTRODE AND PROCESS FOR MAKING SAME

Aldo S. Berchielli, Fresh Meadows, N. Y., assignor to Yardney International Corp., New York, N. Y., a corporation of New York Application January 14, 1953, Serial No. 331,249

3 Claims. (Cl. 136—125)

My present invention relates to electrodes for electric (primary or secondary) batteries adapted to be used, for example, in an alkaline silver-and-zinc battery of the type disclosed in U. S. Patent No. 2,594,709.

It is an object of this invention to provide a novel electrode construction having means for conductively interconnecting major portions of the active electrode material with the aid of wires of relatively inert, highly conductive material, said wires forming a current-distributing network connected to the terminal lead.

It is another object of this invention to provide a simple process for manufacturing an electrode of the character just described.

The foregoing objects are realized, in accordance with this invention, by the provision of a sheet of pliable electrode material adapted to be folded around a set of wires (preferably of silver) which are spread like fingers in different directions, beginning at a point of mutual contact, thereby forming a spider-like network or web encompassing substantially all of the inner sheet surface in contact with said network. The sheet, which may consist of zinc, is preferably perforated to increase its effective surface and to insure adequate penetration by the electrolyte. Pressure exerted upon the relatively soft sheet portions folded around the relatively hard wires causes the latter to become partially imbedded in the enfolding zinc.

The invention will be better understood from the following description, reference being had to the accompanying drawing in which.

Figure 1:
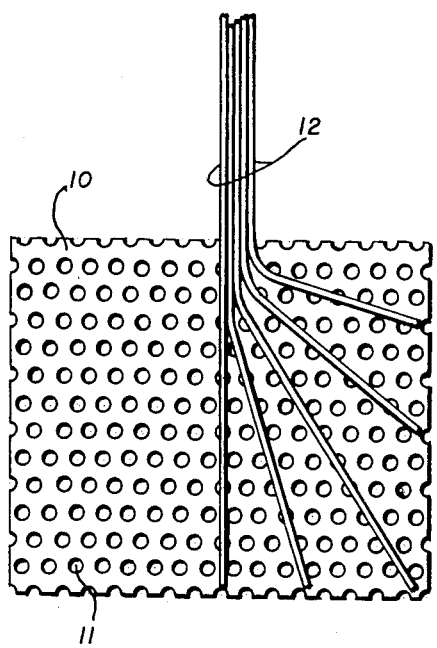
Fig. 1 is a view of an electrode according to the invention prior to folding of its sheet.

The sheet 10, Fig. 1, may be a thin zinc plate and is provided with perforations 11 for the purpose described. A set of wires 12, five of which have been shown by way of example, are spread out like the fingers of a hand to form a current-distributing network encompassing most of the right-hand half of the surface of sheet 10 in Fig. 1; these wires project upwardly beyond the sheet 10 and their upper extremities, which if desired may be twisted together and may be introduced into a protective tube or sheath (not shown), are designed to be connected to the terminal of a battery of which the electrode may form part.

Figure 3:
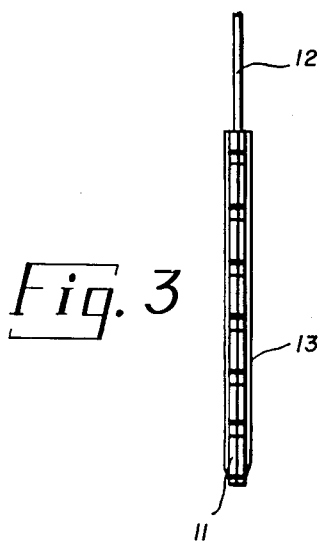
Fig. 3 is an end view of the electrode of Fig. 2.
Figure 2:
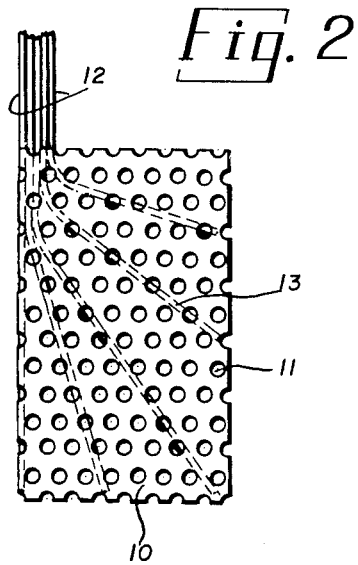
Fig. 2 is a side view of the finished electrode.

Figs. 2 and 3 show how the sheet 10, having been folded around the wires 12, completely encloses the spider-like network or web formed by the lower portions of the wires. The perforations 11 of the two folded halves of the sheet are shown to register with one another, although this is not absolutely necessary. By compressing the zinc sheet 10 between the yieldable plungers, e. g. between layers of paper or rubber, the imbedded portions of the silver wires 12 will impress themselves into the relatively soft zinc and will form ridges 13 on the outer surfaces of the sheet, thereby further increasing the effective surface area of the electrode while anchoring themselves to the body of active material; at the same time the two halves of sheet 10 will be bonded together by the mechanical interengagement between the sheet and the wires.

The invention is, of course, not limited to the specific embodiment described and illustrated but is capable of numerous modifications and adaptations without thereby departing from the scope of the appended claims.

I claim:

1. A battery electrode composed of a folded-over sheet of zinc, a network of silver conductor wires encased within the folded-over sheet, said wires radiating from a point on the sheet periphery and across the folded-over sheet to other peripheral points, said zinc sheet being relatively thinner and softer than said silver wires, the portions of said zinc sheet contiguous with the encased silver wires having ridges that embrace the silver wires and form therewith a self-supporting electrode structure with good electrical conductivity.

2. A battery electrode as defined by claim 1 wherein the zinc sheet contains a plurality of apertures in both sides whereby passage of electrolyte liquor may freely occur through the electrode.

3. A battery electrode as defined by claim 1 wherein a portion of each silver wire is grouped and protrudes beyond a section of the zinc sheet to constitute a terminal lead, and the remaining portion of each radiating silver wire extends to the periphery of the folded-over zinc sheet.

References Cited in the file of this patent

UNITED STATES PATENTS

| 405,196 | Barrett | June 11, 1889 |
| 421,666 | Carpenter | Feb. 18, 1890 |
| 585,853 | Samuel | July 6, 1897 |
| 645,978 | Silvey | Mar. 27, 1900 |
| 1,366,490 | Pouchain | Jan. 25, 1921 |
| 1,550,188 | Vernon | Aug. 18, 1925 |
| 2,515,204 | Evans | July 18, 1950 |

FOREIGN PATENTS

| 1,875 | Great Britain | 1882 |

OTHER REFERENCES

Hackh's Chemical Dictionary, 3d ed., page 921, June 1944.